(12) United States Patent
Tsai et al.

(10) Patent No.: US 9,519,285 B2
(45) Date of Patent: Dec. 13, 2016

(54) SYSTEMS AND ASSOCIATED METHODS FOR TUNING PROCESSING TOOLS

(71) Applicant: TAIWAN SEMICONDUCTOR MANUFACTURING COMPANY, LTD., Hsin-Chu (TW)

(72) Inventors: Po-Feng Tsai, Taipei (TW); Chia-Tong Ho, Taipei (TW); Sunny Wu, Zhudong Town, Hsinchu County (TW); Jo Fei Wang, Hsin-Chu (TW); Jong-I Mou, Hsinpu Township, Hsinchu County (TW); Chin-Hsiang Lin, Hsin-Chu (TW)

(73) Assignee: TAIWAN SEMICONDUCTOR MANUFACTURING COMPANY, LTD., Hsin-Chu (TW)

( * ) Notice: Subject to any disclaimer, the term of this patent is extended or adjusted under 35 U.S.C. 154(b) by 838 days.

(21) Appl. No.: 13/666,176

(22) Filed: Jan. 23, 2013

(65) Prior Publication Data
US 2014/0207271 A1  Jul. 24, 2014

(51) Int. Cl.
G05B 23/02 (2006.01)
G05B 19/4065 (2006.01)

(52) U.S. Cl.
CPC ......... G05B 23/024 (2013.01); G05B 19/4065 (2013.01)

(58) Field of Classification Search
CPC ............ G05B 2219/46031; H01L 22/20; H01L 21/67276
(Continued)

(56) References Cited

U.S. PATENT DOCUMENTS

| 6,081,658 A * | 6/2000 | Rieger ............... G03F 7/70441 250/492.22 |
| 6,526,545 B1 * | 2/2003 | Lin .................. G01R 31/31912 700/113 |

(Continued)

FOREIGN PATENT DOCUMENTS

WO  WO-2012099907 A1  7/2012

OTHER PUBLICATIONS

Korean Intellectual Property Office "Notice of Allowance of Patent" dated Feb. 27, 2015 for Application No. KR-10-2013-0065756, 3 pages.

*Primary Examiner* — Robert Fennema
*Assistant Examiner* — Jigneshkumar Patel
(74) *Attorney, Agent, or Firm* — Haynes and Boone, LLP

(57) ABSTRACT

The present disclosure provides various methods for tuning process parameters of a process tool, including systems for implementing such tuning. An exemplary method for tuning process parameters of a process tool such that the wafers processed by the process tool exhibit desired process monitor items includes defining behavior constraint criteria and sensitivity adjustment criteria; generating a set of possible tool tuning process parameter combinations using process monitor item data associated with wafers processed by the process tool, sensitivity data associated with a sensitivity of the process monitor items to each process parameter, the behavior constraint criteria, and the sensitivity adjustment criteria; generating a set of optimal tool tuning process parameter combinations from the set of possible tool tuning process parameter combinations; and configuring the process tool according to one of the optimal tool tuning process parameter combinations.

20 Claims, 8 Drawing Sheets

(58) Field of Classification Search
USPC .......................................................... 700/121
See application file for complete search history.

(56) References Cited

U.S. PATENT DOCUMENTS

| | | | |
|---|---|---|---|
| 7,330,279 B2 | 2/2008 | Vuong et al. | |
| 8,229,588 B2 | 7/2012 | Tsen et al. | |
| 8,239,056 B2 | 8/2012 | Hsu et al. | |
| 2002/0014601 A1* | 2/2002 | Yoshida | G03F 9/7003 |
| | | | 250/548 |
| 2002/0062162 A1* | 5/2002 | Bunkofske | G05B 23/0221 |
| | | | 700/108 |
| 2002/0191165 A1* | 12/2002 | Baselmans | G03F 7/706 |
| | | | 355/52 |
| 2008/0018887 A1* | 1/2008 | Chen | G01N 21/47 |
| | | | 356/237.2 |
| 2009/0157216 A1* | 6/2009 | Krishnaswamy | G06Q 50/04 |
| | | | 700/121 |
| 2009/0235217 A1* | 9/2009 | Buck | G06F 17/5031 |
| | | | 716/113 |
| 2010/0010784 A1* | 1/2010 | Cao | G03F 7/70091 |
| | | | 703/1 |
| 2010/0146475 A1* | 6/2010 | Cao | G03F 1/144 |
| | | | 716/54 |
| 2012/0130525 A1 | 5/2012 | Tsai et al. | |

* cited by examiner

SYSTEMS AND ASSOCIATED METHODS FOR TUNING PROCESSING TOOLS

BACKGROUND

Integrated circuits are fabricated by processing wafers with a series of wafer fabrication tools (referred to as processing tools). Each processing tool typically performs a wafer fabrication task (referred to as a process) on the wafers according to a predefined (or predetermined) process recipe that specifies various parameters of the process. For example, IC manufacturing typically uses multiple process steps that require many process tools, both production and support related, such that IC manufacturers often focus on monitoring a process tool's hardware and associated process to ensure and maintain stability, repeatability, and yields in IC manufacturing. Such monitoring includes routinely tuning process parameters of the process tool to ensure that the process tool fabricates ICs having desired characteristics. Although existing systems and associated methods for tuning process tools have been generally adequate for their intended purposes, they have not been entirely satisfactory in all respects.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
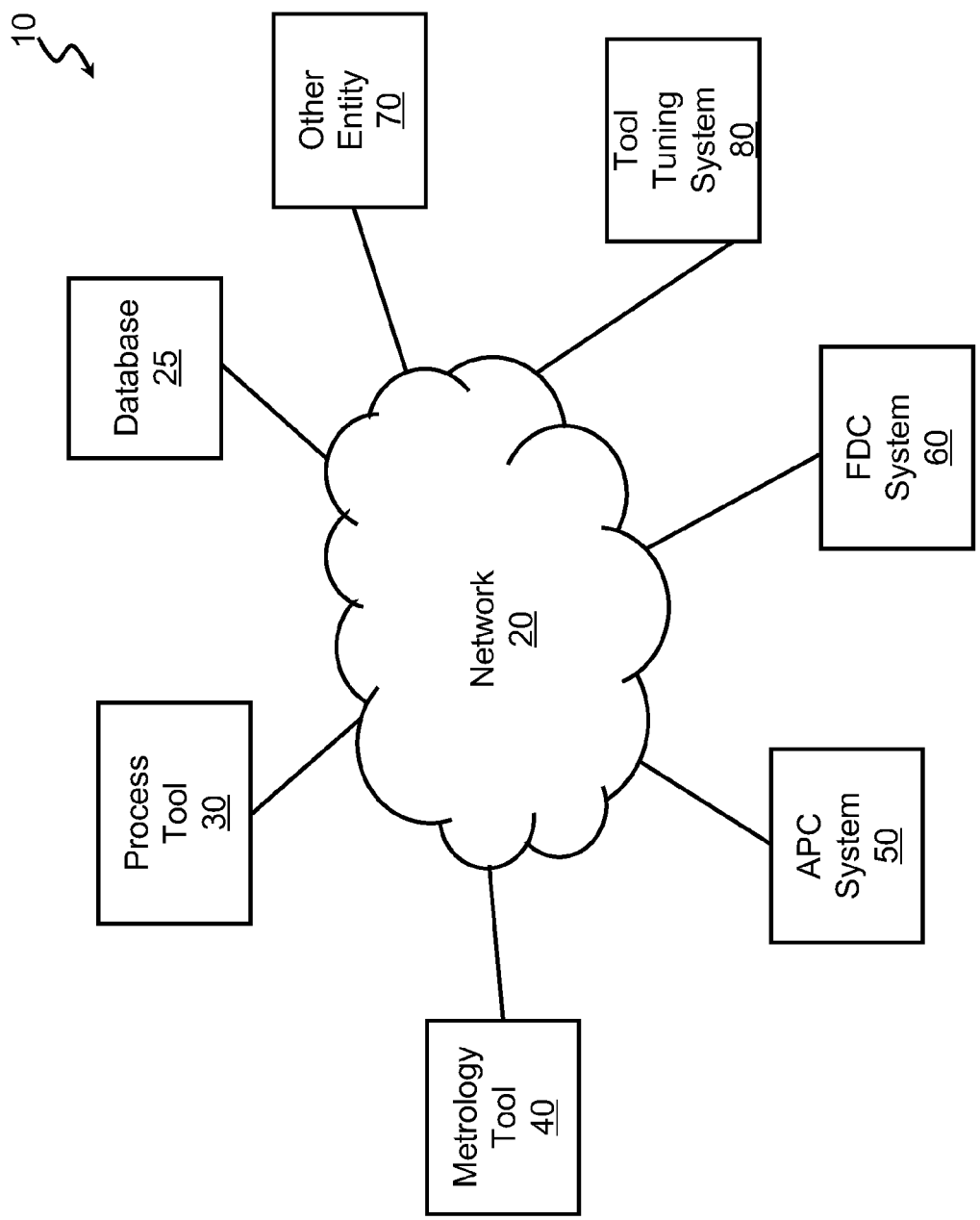
FIG. 1 is a block diagram of an integrated circuit device fabrication system according to various aspects of the present disclosure.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a block diagram of an integrated circuit manufacturing system 10 according to various aspects of the present disclosure. In an example, the integrated circuit manufacturing system 10 is a virtual integrated circuit manufacturing system (a "virtual fab"). The integrated circuit manufacturing system 10 implements integrated circuit manufacturing processes to fabricate integrated circuit devices. For example, the integrated circuit manufacturing system 10 implements semiconductor manufacturing processes that fabricate substrates (or wafers). A substrate includes a semiconductor substrate, a mask (photomask or reticle, collectively referred to as mask), or any base material on which processing is conducted to produce layers of material, pattern features, and/or integrated circuits. In FIG. 1, the integrated circuit manufacturing system 10 has been simplified for the sake of clarity to better understand the inventive concepts of the present disclosure. Additional features can be added in the integrated circuit manufacturing system 10, and some of the features described below can be replaced or eliminated in other embodiments of the integrated circuit manufacturing system 10.

The integrated circuit device fabrication system 10 includes a network 20 that enables various entities (a database 25, a process tool 30, a metrology tool 40, an advanced process control (APC) system 50, a fault detection and classification (FDC) system 60, other entity 70, and a tool tuning system 80) to communicate with one another. The integrated circuit manufacturing system 10 may include more than one of each of the entities in the depicted embodiment, and may further include other entities not illustrated. In the present example, each entity of the integrated circuit manufacturing system 10 interacts with the other entities via the network 20 to provide services to and/or receive services from the other entities. The network 20 may be a single network or a variety of different networks, such as an intranet, an Internet, other network, or combinations thereof. The network 20 includes wired communication channels, wireless communication channels, or combinations thereof.

The database 25 stores data associated with the integrated circuit manufacturing system 10, and particularly data associated with the integrated circuit fabrication processes. In the depicted embodiment, the database 25 stores data collected from the process tool 30, the metrology tool 40, the APC system 50, the FDC system 60, the other entity 70, the tool tuning system 80, or a combination thereof. For example, the database 25 stores data associated with wafer characteristics of wafers processed by the process tool 30 (such as that collected by the metrology tool 40 as further described below); data associated with parameters implemented by the process tool 30 to process such wafers; data associated with analysis of the wafer characteristics and/or parameters by the APC system 50, the FDC system 60, and the tool tuning system 80; and other data associated with the integrated circuit manufacturing system 10. In an example, the process tool 30, metrology tool 40, APC system 50, FDC system 60, other entity 70, and tool tuning system 80 may each have an associated database.

The process tool 30 performs an integrated circuit fabrication process. In the present example, the process tool 30 is a chemical vapor deposition (CVD) tool used for epitaxial growth. The process tool 30 may thus be referred to as a CVD epitaxial tool. A wafer can be placed into the CVD epitaxial tool and subjected to an epitaxial process, such as vapor-phase epitaxy, to form an epitaxial feature of the wafer. The CVD epitaxial tool may include a chamber, a gas source, an exhaust system, a heat source, a cooling system, and other hardware. The chamber serves as a controlled environment for performing the epitaxial process. The gas source provides reactant and purging gases during the epitaxial process, and the exhaust system maintains a pressure within the chamber during the epitaxial process. The heat source includes lamp modules, for example: a bottom inner lamp module, a bottom outer lamp module, a top inner lamp module, and a top outer lamp module. Each lamp module includes an array of infrared lamps that transmit energy to the chamber of the CVD epitaxial tool during the epitaxial process, thereby heating the chamber to a desired chamber temperature and/or the wafer to a desired wafer temperature during the epitaxial process.

To ensure that the epitaxial feature exhibits target wafer characteristics (such as thickness, constituent concentrations, and sheet resistance), the epitaxial process forms the epitaxial feature according to a predetermined (or predefined) epitaxial process recipe. The predetermined (or predefined) epitaxial process recipe specifies various parameters that are implemented by the CVD epitaxial tool to achieve the target wafer characteristics. Such parameters include process time, type of precursor gas, flow rate of precursor gas, chamber temperature, chamber pressure, wafer temperature, other parameters, or combinations thereof. During the epitaxial process, the various hardware of the CVD epitaxial tool (such as the chamber, gas source, exhaust system, heat source, and cooling system) are configured to achieve the specified parameters. The process tool 30 includes sensors that monitor the parameters during processing of the wafers, such as during the epitaxial process. For example, the CVD epitaxial tool includes sensors that monitor the various parameters associated with the CVD epitaxial tool, such as chamber pressure, chamber temperature, wafer temperature, gas flow, deposition time, other parameters (such as various characteristics of the lamp modules of the CVD epitaxial tool, including voltage, current, power, resistance, other characteristic, or combinations thereof), or combinations thereof.

The metrology tool 40 measures and collects data associated with wafers during integrated circuit fabrication. For example, the metrology tool 40 performs inline measurements on the processed wafers to obtain information about various wafer characteristics of the wafers, such as a critical dimension of a feature of the wafer (for example, a line width of the feature), a thickness of a material layer of the wafer, an overlay accuracy between layers or features of the wafer, a dopant profile (or concentration) of a feature, a size and/or type of defect, electrical characteristics of a feature, other wafer characteristics, or combinations thereof. In the depicted embodiment, the metrology tool 40 measures wafer characteristics of wafers processed by the process tool 30. For example, the metrology tool 40 measures a thickness, electrical properties (such as sheet resistance), surface roughness, epitaxial stress, other characteristics, or combinations thereof of the epitaxial features of the wafers formed by the epitaxial process performed by the process tool 30. The metrology tool 40 may include electrical tools, optical tools, analytical tools, other tools, or combinations thereof to measure and collect such data. Such tools include microscopes (for example, scanning electron microscopes and/or optical microscopes), micro-analytical tools, line width measurement tools, mask and reticle defect tools, particle distribution tools, surface analysis tools, stress analysis tools, resistivity and contact resistance measurement tools, mobility and carrier concentration measurement tools, junction depth measurement tools, film thickness tools, gate oxide integrity test tools, capacitance-voltage measurement tools, focused ion beam (FIB) tools, laser surface defect scanners, residual gas analyzers, process tool particle counters, wafer assessment testing tools, other metrology tools, or combinations thereof.

The APC system 50 monitors wafer characteristics of the processed wafers and uses inline metrology data (for example, such as data collected by the metrology tool 40), process models, and various algorithms to provide dynamic fine-tuning of intermediate process targets to enhance final device targets of the wafers. Fine-tuning such process targets may be referred to as control actions, which compensate for tool issues and/or process issues that may produce wafer characteristic variations. The APC system 50 can implement control actions in real time, wafer-to-wafer, lot-to-lot, or a combination thereof. In the depicted embodiment, the APC system 50 implements control actions to modify the epitaxial process recipe performed by the process tool 30 to form the epitaxial features of the wafers. For example, the APC system 50 (based on inline metrology data of processed wafers, process models, and various algorithms) modifies the predetermined epitaxial process recipe (specifically the parameters implemented by the process tool 30, such as process time, flow rate of gas, chamber pressure, chamber temperature, wafer temperature, or other process parameter) for each processed wafer to ensure that the epitaxial features of each processed wafer exhibit the target characteristics.

The FDC system 60 evaluates conditions of the process tool 30 to detect tool issues, such as tool condition deterioration, by monitoring the parameters implemented by the process tool 30 during the integrated circuit fabrication process, and wafer characteristics achieved by parameters implemented by the process tool 30 during the integrated circuit fabrication process. Typically, the FDC system 60 implements statistical process control (SPC) to track and analyze a condition of the process tool 30. For example, the FDC system 60 may implement SPC charts that document historical process performance of the process tool 30 by charting SPC data associated with the process over time. Such SPC data includes the parameters and/or the wafer characteristics associated with multiple wafers processed by the process tool 30. When the SPC data indicates that parameters and/or wafer characteristics have departed from acceptable targets (in other words, when the FDC system 60 detects a fault or abnormality), the FDC system 60 triggers an alarm and notifies an operator of the process tool 30, halts the process performed by the process tool 30, takes another action, or a combination thereof, so that any issues with the process tool 30 may be identified and remedied.

In the present example, to detect issues with the CVD epitaxial tool, the FDC system 60 monitors the parameters implemented by the process tool 30 to form the epitaxial features of the wafers. The FDC system 60 evaluates these parameters and wafer characteristics to detect abnormalities, or faults, during operation of the CVD epitaxial tool. In an example, an abnormality is indicated when, during an epitaxial process, a chamber pressure or chamber temperature varies (higher or lower) significantly from a specified chamber pressure or chamber temperature, such as the predetermined epitaxial process recipe. In another example, an abnormality is indicated when, during an epitaxial process, a flow rate of a precursor gas varies (higher or lower) significantly from a specified flow rate of the precursor gas, such as the predetermined epitaxial process recipe. In yet another example, an abnormality is indicated when a characteristic (such as sheet resistance, thickness, and/or stress) of epitaxial features of the wafers formed by the CVD epitaxial tool varies significantly from its target characteristic. Such abnormalities may indicate issues with the process tool 30. For example, damaged or aging hardware of the CVD epitaxial tool may cause the chamber pressure, chamber temperature, and/or flow rate of precursor gas to vary from the expected chamber pressure, chamber temperature, and/or flow rate of precursor gas.

The tool tuning system 80 to tunes the process tool 30 (in the present example, the CVD epitaxial tool) for integrated circuit device fabrication. The process tool 30 requires routine and/or non-routine maintenance due to process drift or failure/aging of its hardware. Routine maintenance arises when the process tool 30 is removed from production (taken offline) for maintenance after a certain amount of operation time or after a certain amount of wafers has been processed. Non-routine maintenance arises when the FDC system 60 detects an abnormality or fault during operation of the process tool 30 and triggers an alarm to notify an engineer (also referred to as operator, technician, or technical personnel) of the process tool 30. The process tool 30 is then removed from production (taken offline) for maintenance. The routine and/or non-routine maintenance can include cleaning interior walls and/or parts of a processing chamber of the process tool 30 to remove residues or deposited films on the interior walls and/or parts. The maintenance can further include removing parts from the process tool 30, which are put back or replaced during servicing. The various maintenance (servicing) processes performed on the process tool 30 can cause the process tool 30 to perform differently after the maintenance (servicing) processes. In an example, cleaning the processing chamber results in the chamber interior behaving differently compared to before the cleaning. In another example, handling parts of the process tool 30 (whether removed and put back together or removed and replaced) changes operating characteristics of the process tool 30. Accordingly, setting processing parameters of the process tool 30 to the same processing parameters used before the maintenance might not yield the same, desired wafer characteristics. As a result, after the process tool 30 is serviced (or maintained), the process tool 30 undergoes a tuning process to qualify it for further wafer production and ensure that the process tool 30 produces wafers meeting specification.

Figure 2:
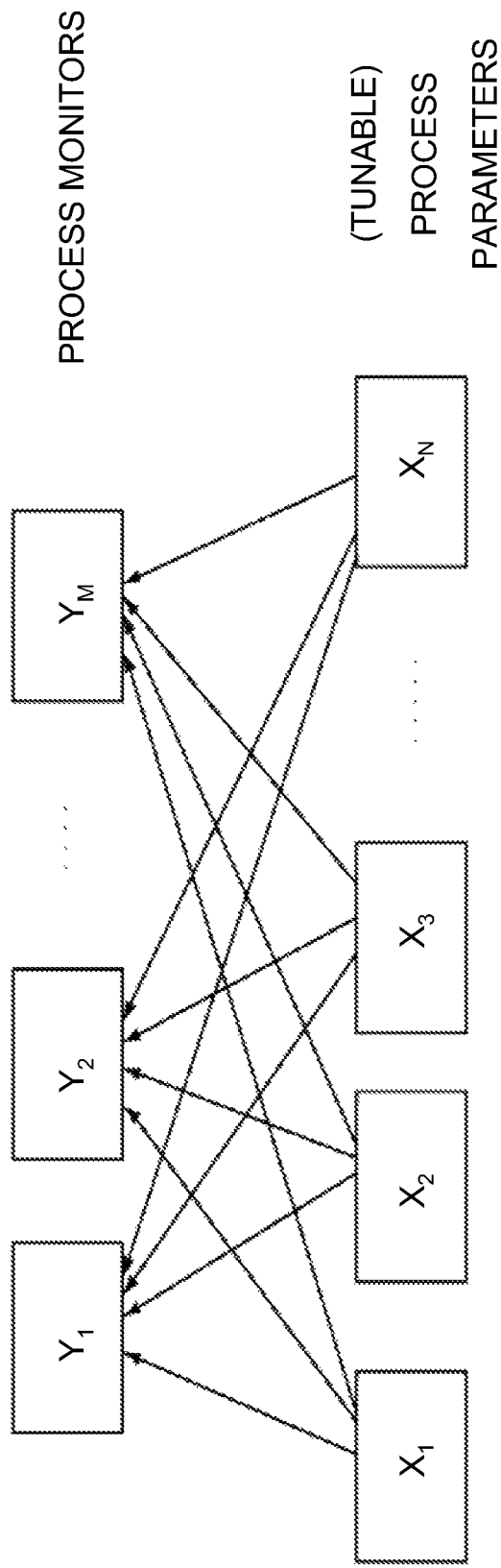
FIG. 2 shows a schematic diagram of various tunable process parameters with correlating process monitor items according to various aspects of the present disclosure.

Various process parameters of the process tool 30 are tuned during the tuning process. The process parameters of the process tool 30 are tuned properly to ensure that the process tool 30 produces wafers having the desired wafer characteristics. The tunable process parameters of the process tool 30 are thus correlated with various wafer characteristics. FIG. 2 shows a schematic diagram of various tunable process parameters with correlating process monitor items (wafer characteristics) according to various aspects of the present disclosure. For example, the process tool 30 has $X_1, X_2, X_3, \ldots X_N$ tunable process parameters. Where the process tool 30 is the CVD epitaxial tool, the tunable process parameters can include heater power (to adjust chamber temperature and/or wafer temperature), vacuum power settings (to adjust chamber pressure), radio frequency power, bias power, a distance between the processed wafers and a top electrode of the CVD epitaxial tool, gas flow rates, and other tunable process parameters. Each tunable process parameter, such as $X_1, X_2, X_3, \ldots X_N$, directly or indirectly affects an outcome of each process monitor item (wafer characteristic) of the processed wafers, such as $Y_1, Y_2, Y_3, \ldots Y_M$. For example, where the process tool 30 is the CVD epitaxial tool, process monitor items (wafer characteristics for process monitoring) can include thickness of the epitaxial features, sheet resistance of the epitaxial features, stress of the epitaxial features, critical dimensions of the epitaxial features, profiles of the epitaxial features, and other wafer characteristics. In the present example, for ease of the following discussion, the CVD epitaxial tool has four tunable process parameters ($X_1, X_2, X_3$, and $X_4$) and three process monitor items ($Y_1, Y_2, Y_3$). The four tunable process parameters include a gas flow rate of a precursor gas (such as a silicon-containing precursor gas (for example, $SiH_4$)), a high frequency radio frequency (HFRF) power, a deposition time (DepTime), and a spacing (a distance between wafer and a top electrode of the CVD epitaxial tool during processing). The four tunable process parameters directly or indirectly affect the three process monitor items (wafer characteristics): stress (S) of the epitaxial features, sheet resistance (RI) of the epitaxial features, and thickness (THK) of the epitaxial features. Accordingly, during the tuning process, the gas flow rate of the precursor gas, the HFRF power, the deposition time, and the spacing are tuned to achieve desired thickness, sheet resistance, and stress of the epitaxial features. The tuned gas flow rate, HFRF power, deposition time, and spacing are referred to as a process parameter tool set.

The process tool 30 is often tuned manually. For example, the engineer familiar with the process tool 30 and its associated processes conducts trial-and-error techniques, where various combinations of process parameters (different process parameter tool settings) are implemented to achieve the desired wafer characteristics (in other words, process monitors that meet specification). For older process technologies, such manual tuning is adequate since process windows for the older process technologies are often relatively wide, such that the manual tuning can be achieved in a reasonable time frame. However, for advanced processing technologies, as technology nodes decrease, the number of process monitor items ($Y_M$) increase with narrowing process windows (in other words, narrower ranges between upper and lower limits). Manual tuning thus becomes very time consuming. The engineer can spend hours or even days qualifying the process tool 30 for production. Further, since the engineer typically implements a tuning method based on the engineer's individual experience with qualifying process tools, the process tool 30 is qualified (or tuned) differently by different engineers such that the process tool 30 implements different process parameter tool settings to achieve the desired wafer characteristics. Over time, the behavior of the process tool 30 will drift differently depending on the process parameter tool settings implemented by different engineers. Since the tuned process parameter tool settings are not standardized, performance of the process tool 30 thus varies depending on the engineer that tuned the process tool 30. More recently, complex statistical tuning has been implemented to tune the process tool 30. Statistical tuning methods typically require high computation power and time. Further, the tuned process parameter tool settings are generally random, meaning that a statistical tuning method generates different process parameter tool tuning solutions every time it is run, and the tuned process parameter tool settings generally fail to account for whether such settings are feasible or practical in actual operation of the process tool.

Figure 3:
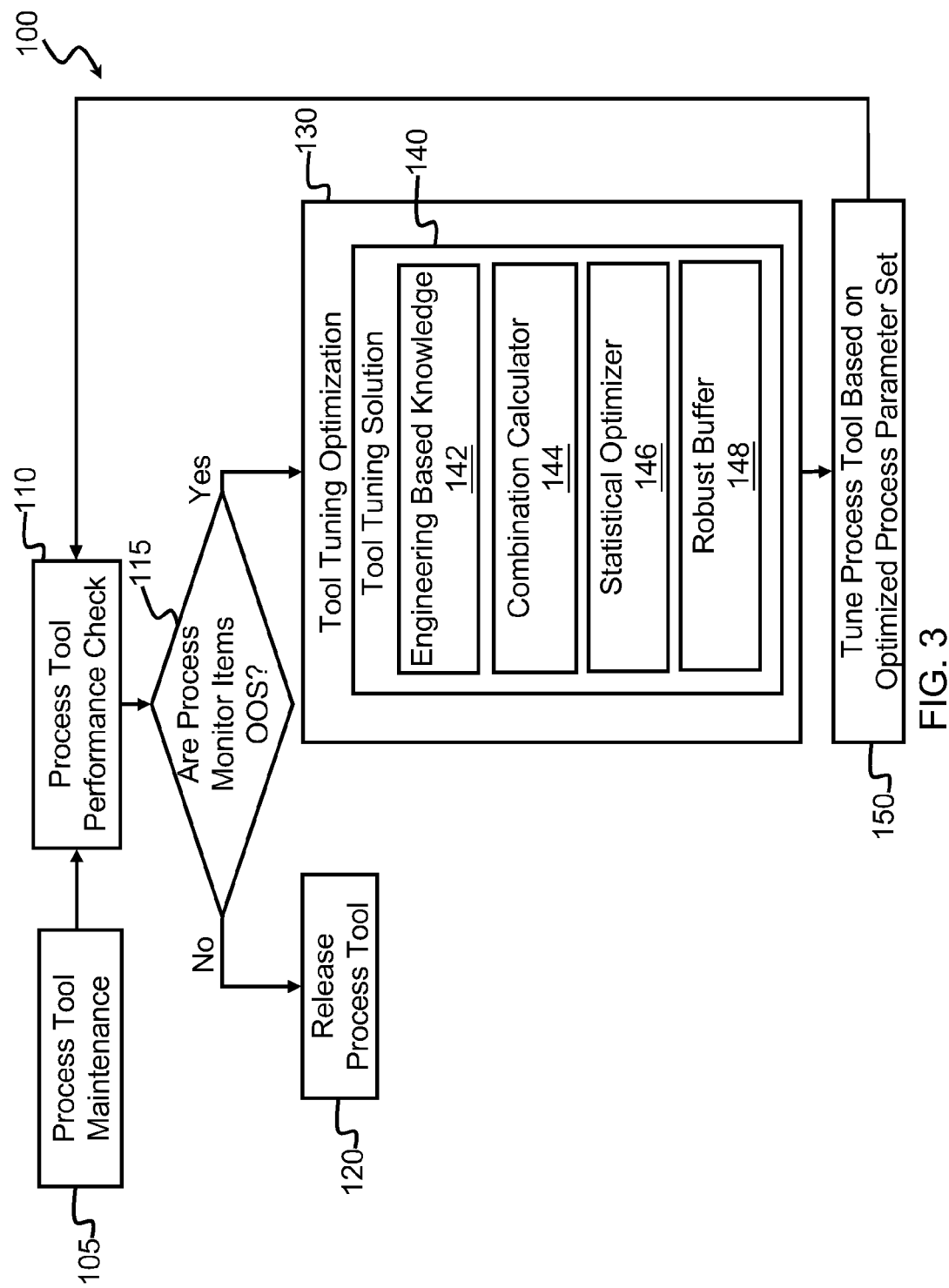
FIG. 3 is a block diagram of a tool tuning process flow that can be implemented by an integrated circuit manufacturing system to tune a process tool, such as a process tool of the integrated circuit manufacturing system of FIG. 1, according to various aspects of the present disclosure.
Figure 4:
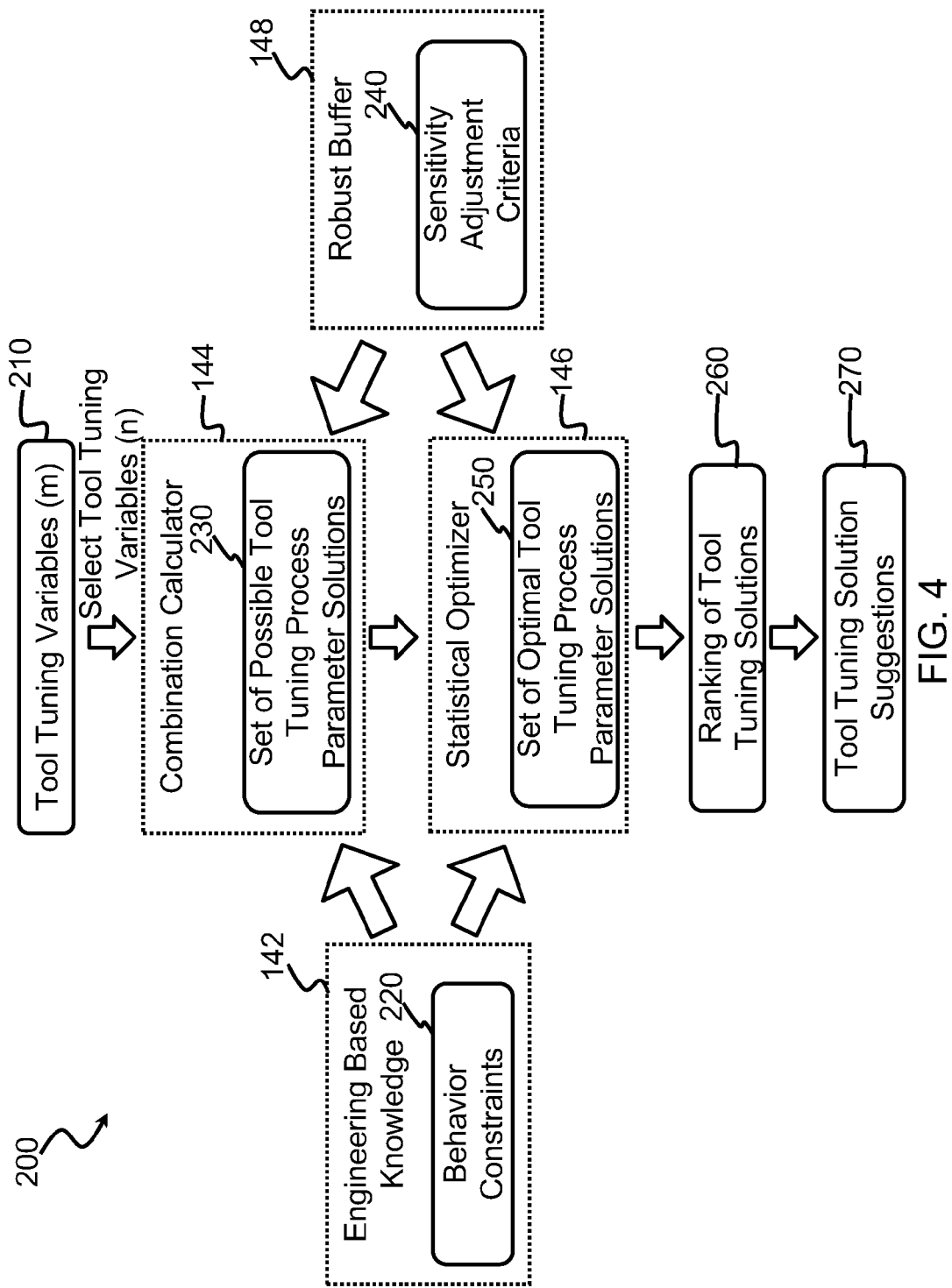
FIG. 4 is a block diagram of a tool tuning optimization process flow that can be implemented in a tool tuning process flow, such as the tool tuning process flow of FIG. 3, according to various aspects of the present disclosure.
Figure 5:
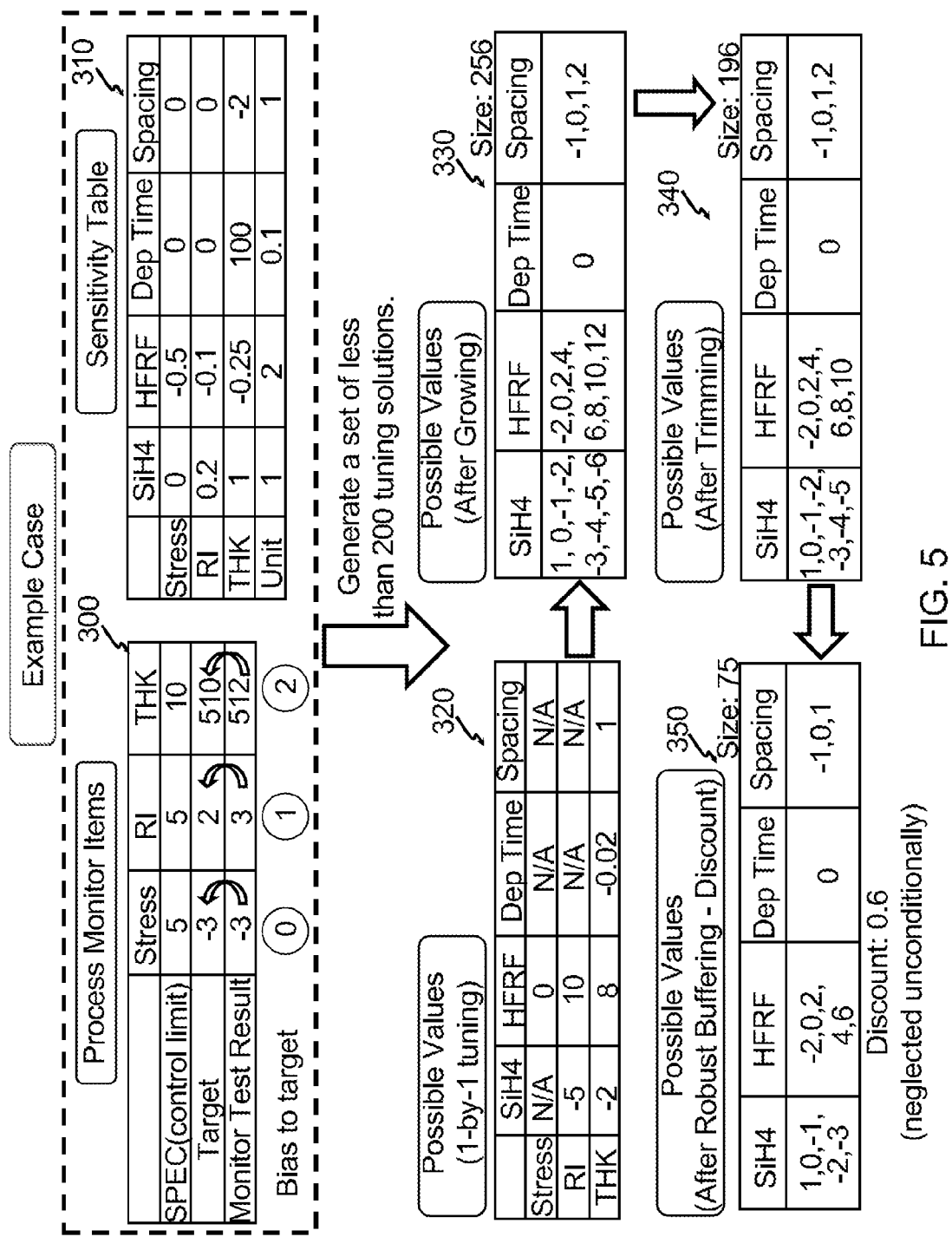
FIG. 5 provides an exemplary case where the tool tuning process flow of FIG. 3 and the tool tuning optimization process flow of FIG. 4 are implemented to generate an optimal set of process parameters for tuning a process tool, such as a process tool in the integrated circuit manufacturing system of FIG. 1, according to various aspects of the present disclosure.

The tool tuning system 80 remedies many issues experienced by current tool tuning methodologies. In particular, as described in detail below, the tool tuning system 80 automatically determines (or calculates) a best combination of process parameters for the process tool 30. The tool tuning system 80 (and methods associated therewith) provides convergent, feasible, and practical tool tuning process parameter solutions. The tool tuning system 80 thus provides a cost-effective and time-effective avenue for qualifying the process tool 30 for production. FIG. 3 is a block diagram of a tool tuning process flow 100 implemented by the integrated circuit manufacturing system 10 of FIG. 1 according to various aspects of the present disclosure, and FIG. 4 is a block diagram of a tool tuning optimization process flow 200 that can be implemented in the tool tuning process flow 100 according to various aspects of the present disclosure. In the present example, the tool tuning system 80 implements the tool tuning process flow 100 and the tool tuning optimization process flow 200 to optimize tuning of the process tool 30 (in the present example, the CVD epitaxial tool) for integrated circuit device fabrication. FIG. 5 provides an exemplary case where the tool tuning process flow 100 of FIG. 3 and the tool tuning optimization process flow 200 of FIG. 4 are implemented by the tool tuning system 80 to generate an optimal process parameter tool sets for tuning the process tool 30, such as the CVD epitaxial tool, according to various aspects of the present disclosure. FIGS. 3-5 will be discussed concurrently, and FIGS. 3-5 have been simplified for the sake of clarity to better understand the inventive concepts of the present disclosure. Additional steps and/or features can be provided in the tool tuning process flow 100 and the tool tuning optimization process flow 200, and some of the steps and/or features described can be replaced or eliminated for additional embodiments of the tool tuning process flow 100 and the tool tuning optimization process flow 200. Further, the following discussion related to tuning the CVD epitaxial tool is exemplary only, and it is contemplated that the tool tuning process flow 100 and the tool tuning optimization process flow 200 can be implemented by the tool tuning system 80 to tune any type of process tool 30 and any type of module of the process tool 30.

In FIG. 3, at block 105, maintenance (servicing) is performed on the process tool 30. At block 110, a process tool performance check 110 is performed to evaluate performance of the process tool 30. For example, various process parameters of the process tool 30 are set according to a process recipe (a process parameter tool set intended to achieve desired wafer characteristics), the process tool 30 processes a set of wafers according to the process recipe, and wafer characteristics of the processed set of wafers are collected, compiled, and evaluated to determine whether the processed set of wafers exhibits the desired wafer characteristics. The set of wafers may be referred to as a test set of wafers. In an example, process parameter tool set intended to achieve the desired wafer characteristics is the process parameter tool set that was implemented by the process tool 30 before maintenance. In the present example, process recipe includes a process parameter tool set specifying the gas flow rate, HFRF power, deposition time, and spacing for processing the test set of wafers; the gas flow rate, HFRF power, deposition time, and spacing of the CVD epitaxial tool are set according to process recipe; and the CVD epitaxial tool processes the set of wafers to form epitaxial features.

Data associated with the test set of processed wafers is collected and compiled in time-series charts (T-charts). The data thus includes process parameter data associated with the process parameters implemented by the process tool 30 to form the epitaxial features of each wafer. As noted above, the parameters include chamber pressure, chamber temperature, wafer temperature, gas flow, deposition time, other parameters (such as various characteristics of the lamp modules of the CVD epitaxial tool, including voltage, current, power, resistance, other characteristics, or combinations thereof). The data also includes process monitor item (wafer) data associated with the processed wafers, such as sheet resistance, thickness, and stress of the epitaxial features of the processed wafers, other wafer characteristics, or combinations thereof. Such process monitor item data and process parameter data is collected and may be stored in the database 25 or other database associated with the process tool 30. Statistical analysis is then performed on the time-series data (T-charts), thereby reducing the amount of data for evaluation, and performance of the process tool 30 is evaluated based on the statistically analyzed time-series data. For example, statistical process control is implemented to transform the time-series process parameter data and process monitor item (wafer) data into control charts (for example, Xbar-R control charts, Xbar-S control charts, I-MR control charts, C control charts, U control charts, Z control charts, other control charts, or combinations thereof) that can be used to evaluate whether the wafer characteristics are within specification. The control charts analyze the time-series data according to statistics, where the process limits are defined by the statistical analysis (such as a standard deviation of the analyzed data). For example, the control charts include a centerline that represents an average (mean) value of the analyzed data, and an upper control limit (maximum) and lower control limit (minimum) defined by statistical analysis, particularly within a number of standard deviations of the analyzed data. In the present example, in FIG. 5, an exemplary table 300 of analyzed process monitor item (wafer) data provides information associated with the stress, sheet resistance, and thickness of the epitaxial features of the test set of wafers. The table 300 specifies target wafer characteristics: a target stress ($S_{target}$) is −3 GPa, a target sheet resistance ($RI_{target}$) is 2 ohms/square, and a target thickness ($T_{target}$) is 510 nm. The wafer characteristics of the test set of wafers are included in table 300: a test stress ($S_{test}$) is −3 GPa, a test sheet resistance ($RI_{test}$) is 2 ohms/square, and a test thickness ($T_{test}$) is 512 nm. A bias (or difference) between the target stress and the test stress is 0, a bias (or difference) between the target sheet resistance and test sheet resistance is 1, and a bias (or difference) between the target thickness and the test thickness is 2. The table 300 further specifies control limits for each of the wafer characteristics. For example, a stress that falls within a range of ±5 of the $S_{target}$ is within specification, a sheet resistance that falls within a range of ±5 of the $RI_{target}$ is within specification, and a thickness that falls within a range of ±10 of the $T_{target}$ is within specification.

Referring again to FIG. 3, at block 115, the process monitor item (wafer) data is evaluated to determine whether it is out of specification. For example, the test stress is evaluated to determine whether it falls within an acceptable range from the target stress, the test sheet resistance is evaluated to determine whether it falls within an acceptable range for the target sheet resistance, and the test thickness is evaluated to determine whether it falls within an acceptable range from the target thickness. If the process monitor item data is not out of specification (within specification), the process tool 30 is released for production at block 120. If the process monitor item data is out of specification (falls outside the acceptable range), the tool tuning process flow 100 continues to a tool tuning optimization module 130 (also referred to as block 130) that implements the tool tuning optimization process flow 200 to determine an optimal process parameter tool set for tuning the process tool 30 to achieve the desired wafer characteristics. In the present example, the tool tuning system 80 includes the tool tuning optimization module 130. The tool tuning optimization module 130 includes a tool tuning solution module 140 that generates various process parameter tool sets for tuning the process tool 30 to achieve the desired wafer characteristics. As noted above, in the present example, for the sake of clarity to better understand the inventive concepts of the present disclosure, the following discussion will be limited to providing an optimal process parameter tool set that includes the gas flow rate of the precursor gas (specifically silicon-containing precursor gas ($SiH_4$)), the HFRF power, the deposition time, and the spacing for tuning the CVD epitaxial tool to form epitaxial features exhibiting desired stress, sheet resistance, and thickness. Accordingly, in FIG. 4, at block 210, though the process tool 30 has a number of process parameters N ($X_1$, $X_2$, $X_3$, ... $X_N$), a number of those process parameters, n, is selected for tuning such that a set of possible combinations C(N,n) is generated by the tool tuning solution module 140. Such discussion is not intended to be limiting, and the present disclosure contemplates that the tool tuning optimization process flow 200 can determine optimal process parameter tool sets including fewer or more process parameters to achieve fewer or more desired wafer characteristics.

In the depicted embodiment, in FIG. 3 and FIG. 4, the tool tuning solution module 140 includes an engineering based knowledge module 142, a combination calculator module 144, a statistical optimizer module 146, and a robust buffer module 148 that collaborate to generate the optimal process parameter tool sets. In FIG. 4, at block 220, the engineering based knowledge module 142 defines constraints (specified by the engineer or tuning system 80 based on historical data and/or experience) that the combination calculator module 144 and the statistical optimizer module 146 apply to narrow the optimal process parameter tool sets. Such constraints, based on the engineer's knowledge and experience, specify rules that cannot be violated to ensure desired wafer quality (desired wafer characteristics). The engineering based knowledge module 142 defines constraints on tuning the process parameters based on how the process parameters are correlated to one another, how the process parameters are correlated to the process monitor items, and how the process monitor items are correlated to one another.

(1) Constraints between the process parameters define limits on how the process parameters are tuned in relation to one another (X to X constraints). For example, previous experience indicates that to ensure etching of the epitaxial features by the precursor gas stays within specification, any change in gas flow rate should be confined by upper and lower limits. An exemplary process parameter constraint for avoiding undesired etching thus constrains tuning the process tool to a total unit change in gas flow rate of:

$$-5 \leq \Delta SiH_4(side) + \Delta SiH_4(top) \leq 5$$

where $\Delta SiH_4$ (side) is a unit change in gas flow rate of the silicon-containing precursor gas from a side of the process chamber and $\Delta SiH_4$ (top) is a unit change in gas flow rate of the silicon-containing precursor gas from a top of the process chamber.

(2) Constraints between the process parameters and the process monitor items define whether process parameters should be tuned based on the wafer characteristics of the set of processed wafers (X to Y constraints). For example, if a difference between a wafer characteristic exhibited by the set of processed wafers is within a specified range from the desired wafer characteristic, a process parameter that affects such wafer characteristic is disabled for tuning. In the present example, previous experience indicates that gas flow rate affects the sheet resistance of the epitaxial features and that RF power affects the stress of the epitaxial features. An exemplary process parameter/process monitor item constraint can thus specify that if a sheet resistance difference ($\Delta RI = RI_{test} - RI_{target}$) between the desired sheet resistance ($RI_{target}$) and the sheet resistance of the epitaxial features of the set of processed wafers ($RI_{test}$) is within a specified range, tuning of the gas flow rate is disabled. For example, if $-0.001 < \Delta RI < 0.01$, then $SiH_4$ is disabled for tuning.

Another exemplary process parameter/process monitor item constraint can specify that if a stress difference ($\Delta S = S_{test} - S_{target}$) between the desired stress ($S_{target}$) and the stress of the epitaxial features of the set of processed wafers ($S_{test}$) is within a specified range, tuning of the HFRF power is disabled. For example, if $-0.2 < \Delta S < 0.2$, then $SiH_4$ is disabled for tuning.

The process parameter/process monitor item constraints recognize that, if a variation of a wafer characteristic from the desired wafer characteristic is small, tuning process parameters that affect such wafer characteristics should be limited to minimize changes in the wafer characteristic during tuning.

(3) Constraints between the process monitor items define an optimization object function (OOF), such as that provided by:

$$OOF = Min|W_1 * \Delta S + W_2 * \Delta RI + W_3 * \Delta T|$$

where $W_1$, $W_2$, and $W_3$ are weighted values respectively for a change in stress ($\Delta S = S_{test} - S_{target}$), a change in sheet resistance ($\Delta RI = RI_{test} - RI_{target}$), and a change in thickness ($\Delta T = T_{test} - T_{target}$). The optimization object function thus weights changes in the process monitors relative to one another. As further discussed below, the optimal process parameter tool set minimizes a value of the optimization object function, with the optimization object function ideally equal to zero. In the present example, for purposes of discussion, if the thickness and the stress of the epitaxial features is considered critical, the sheet resistance can be "sacrificed" to ensure that the stress and thickness are as close to the target stress and target thickness as possible, thereby providing the following object optimization function ($W_1=6$, $W_2=1$, and $W_3=6$):

$$OOF = Min|6 * \Delta S + 1 * \Delta RI + 6 * \Delta T|.$$

Figure 6:
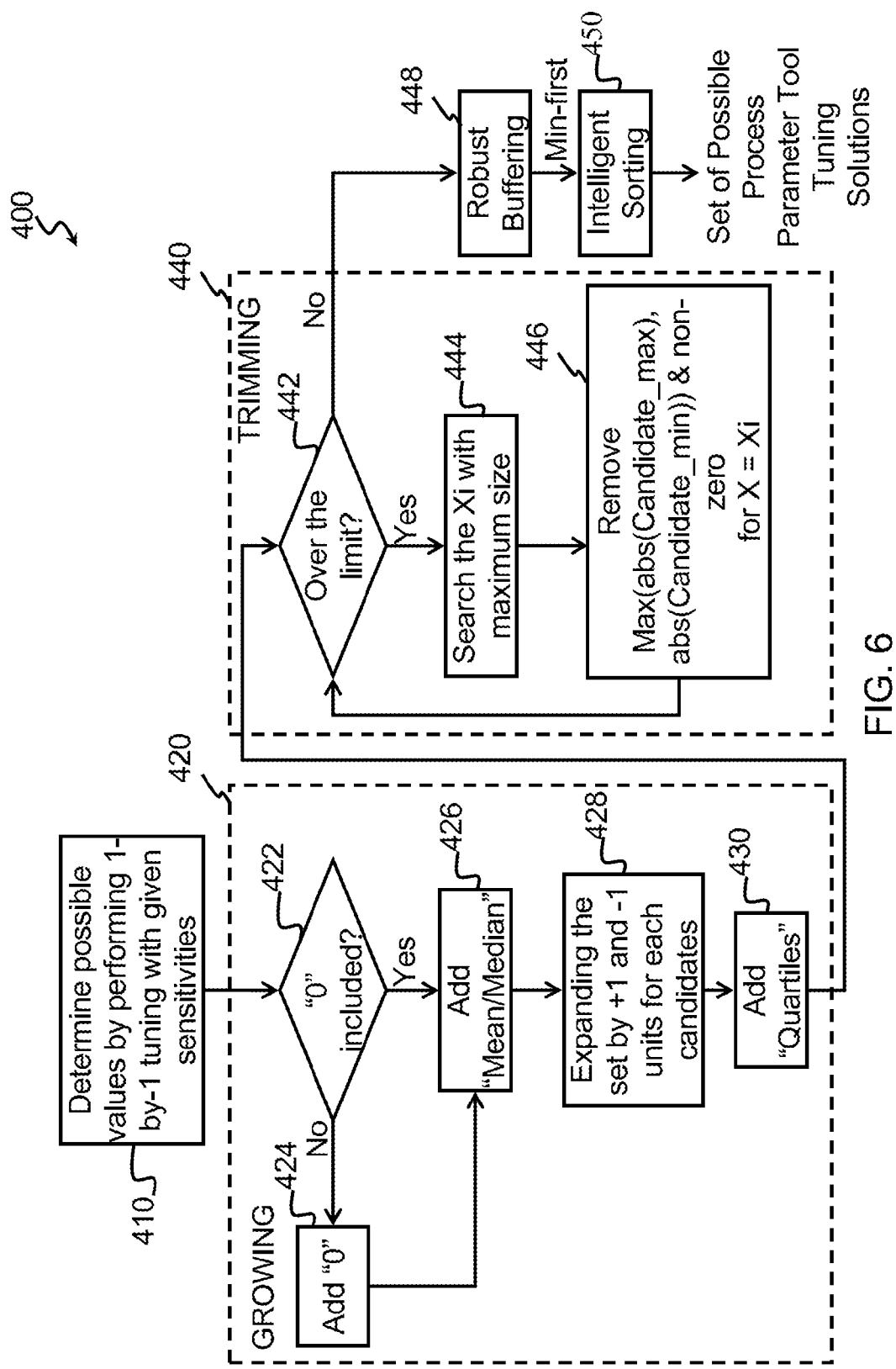
FIG. 6 is a block diagram of a process flow that can be implemented to generate the set of possible process tool tuning process parameter combinations according to various aspects of the present disclosure.

In FIG. 4, at block 230, the combination calculator module 144 generates a set of possible process parameter tool tuning solution sets. FIG. 6 is a block diagram of a process flow 400 that can be implemented by the tool tuning solution module 140 to generate the set of possible process parameter sets according to various aspects of the present disclosure. In the present example, the combination calculator module 144 implements the process flow 400 to generate the set of possible process parameter sets at block 230. At block 410, the combination calculator module 144 generates possible process parameter values by determining how a single process parameter should be tuned to achieve a single target wafer characteristic (from its corresponding single test wafer characteristic). Such generation considers how the process parameters (here, the gas flow rate, HFRF power, deposition time, and spacing) each directly or indirectly affect the process monitor items (here, stress, sheet resistance, and thickness of the epitaxial features). Referring to the example case in FIG. 5, a sensitivity table 310 defines sensitivities of the process monitor items ($Y_1$, $Y_2$, $Y_3$) to a change in the process parameters ($X_1$, $X_2$, $X_3$, $X_4$) selected for tuning. The sensitivity table 310 indicates how a unit change in each process parameter respectively affects each process monitor item. For example, the sensitivity table 310 indicates that changing the gas flow rate does not affect the stress, changing the gas flow rate by one unit increases the sheet resistance by 0.2 ohm/square, and changing the gas flow rate by one unit increases the thickness by 1 nm. The sensitivity table 310 also indicates that the HFRF power affects the stress, sheet resistance, and thickness. For example, for every two unit increase in HFRF power, the stress is decreased by −0.5 GPa, the sheet resistance is decreased by −0.1 ohm/square, and the thickness is decreased by −0.25 nm. The sensitivity table 310 further indicates that only the thickness is affected by changing the deposition time (for every 0.1 unit change in deposition time, the thickness is increased by 100 nm) and spacing (for every one unit change in spacing, the thickness is decreased by 2 nm). The sensitivity table 310 is generated using data associated with test wafers processed by the process tool 30, historical data associated with wafers processed by the process tool 30, the engineer's experience and/or knowledge, other factors, or a combination thereof.

At block 410, the combination calculator module 144 uses the sensitivity table 310 to generate a one-by-one tuning table 320 that indicates how each process parameter is tuned to achieve each target wafer characteristic. For example, since the sensitivity table 310 indicates that tuning the gas flow rate, the deposition time, and the spacing does not affect the stress, the one-by-one tuning table 320 indicates that tuning of these process parameters is not applicable (N/A) to achieving the target stress. Further, since the test stress meets the target stress (table 300) and changes in the HFRF power changes the stress (table 310), the one-by-one tuning table 320 indicates that to maintain the target stress, no tuning (0) to the HFRF power is needed to maintain the target stress. For the sheet resistance, since the sensitivity table 310 indicates that tuning the deposition time and the spacing does not affect the stress, the one-by-one tuning table 320 indicates that tuning of these process parameters is not applicable (N/A) to achieving the target sheet resistance. Since the sheet resistance is higher than the target sheet resistance by 1 ohm/square (table 300) and the sensitivity table 310 indicates that every one unit increase in gas flow rate increases the sheet resistance by 0.2 ohm/square, the one-by-one tuning table 320 indicates that decreasing the gas flow rate by 5 units achieves the target sheet resistance (by decreasing the sheet resistance by 1 ohm/square to achieve the target sheet resistance). Further, since the sheet resistance is higher than the target sheet resistance by 1 ohm/square (table 300) and the sensitivity table 310 indicates that every two unit increase in HFRF power decreases the sheet resistance by −0.1 ohm/square, the one-by-one tuning table 320 indicates that increasing the HFRF power by 10 units achieves the target sheet resistance (by decreasing the sheet resistance by 1 ohm/square to achieve the target sheet resistance). Similarly, for the thickness, since the thickness is higher than the target thickness by 2 nm (table 300), the one-by-one tuning table 320 indicates that decreasing the gas flow rate by 2 units achieves the target thickness (since every one unit increase in gas flow rate increases the thickness by 1 nm), increasing the HFRF power by 8 units achieves the target thickness (since every 2 unit increase in HFRF power decreases the thickness by 0.25 nm), decreasing the deposition time by 0.02 units achieves the target thickness (since every 0.1 unit increase in time increases the thickness by 100 nm), and increasing the spacing by one unit achieves the target thickness (since every one unit increase in spacing decreases the thickness by 2 nm).

The combination calculator module 144 then generates possible unit changes for each of the process parameters by implementing a growing process 420, thereby generating table 330. For example, referring to FIGS. 5 and 6, the combination calculator module 144 generates possible unit changes for the gas flow rate ($SiH_4$) that include 1, 0, −1, −2, −3, −4, −5, and −6 in table 330 as further described. The table 330 includes the possible unit changes provided in the one-by-one tuning table 320 (here, −5 and −2 for the gas flow rate). At block 422, the combination calculator module 144 evaluates the possible unit changes for each process parameter provided in the one-by-one tuning table 320 to determine whether the possible unit changes include zero (0). If the possible unit changes do not include zero, at block 424, zero is added to the possible unit changes and then the growing process continues to block 426. If the possible unit changes do include zero, the growing process 420 continues to block 426. In the present example, the possible unit value changes for the gas flow rate provided in the one-by-one tuning table 320 do not include zero, so zero is added to the possible unit changes. At block 426, the combination calculator module 144 determines a mean of the possible unit changes, and the mean is then included as possible unit changes. In the present example, for gas flow rate, the possible unit changes currently include −5, −2, and 0, and the mean of the possible unit changes is about −2.333. The mean is rounded to the nearest whole unit, so the mean is −2. Since the possible unit changes already include −2, no additional possible unit change is added to the possible unit changes at block 426. Alternatively or additionally, a median of the possible unit changes is determined and included in the possible unit changes. The growing process 420 continues to block 428, where the combination calculator module 14 expands the possible unit changes by adding +1 and −1 unit to each possible unit value. Accordingly, in the present example, a unit is added and subtracted from −5 to give −4 and −6 possible unit changes, a unit is added and subtracted to −2 to give −3 and −1 possible unit changes, and a unit is added and subtracted from 0 to give 1 and −1 as possible unit changes. The combination calculator module 144 then continues the growing process 420 at block 428 by determining quartiles for the possible unit changes (at this point, 1, 0, −1, −2, −3, −4, −5, and −6) and including the quartiles as possible unit changes, thereby further expanding the possible unit changes for the gas flow rate. Similar to determining the mean (or median), the quartiles are rounded to the nearest whole unit. In the present example, the quartiles are already included as possible unit changes. The combination calculator module 144 thus generates the possible unit changes 1, 0, −1, −2, −3, −4, −5, and −6 for the table 330. The combination calculator module 144 similarly implements the growing process 420 to further provide possible unit changes for the HFRF power, the deposition time, and the spacing in table 330. By implementing the growing process 420, the combination calculator module 144 generates about 256 possible process parameters tool set solutions based on the possible unit changes for the process parameters in table 330 (generated after the trimming process 440). The combination calculator module 144 thus increases the number of possible tool tuning process parameter combinations from the number of possible tool tuning process parameter combinations generated using table 320.

The combination calculator module 144 then reduces the possible unit changes for each of the process parameters by implementing a trimming process 440, thereby generating table 340. In the present example, it is desired to reduce the possible process parameter tool sets to less than about 200, and based on the possible unit changes for the process parameters in table 330, the combination calculator module 144 has generated about 256 possible process parameter tool set solutions for tuning the process tool 30. Referring to FIGS. 5 and 6, at block 442, the combination calculator module 144 thus determines that the possible process parameter tool sets exceeds a specified limit (here, there are 56 more possible parameter tool sets than requested or desired). Since the possible process parameter tool sets exceed the specified limit, at block 444, the combination calculator module 144 evaluates the number of possible unit changes for each process parameter ($X_i$) to determine which process parameters have the most possible unit changes. In the present example, both the gas flow rate and the HFRF power have the most possible unit changes (specifically, eight possible unit changes). At block 446, the combination calculator module 144 determines an absolute max possible unit change and absolute min possible unit change from the possible unit changes of the process parameter having the most possible unit changes (determined at block 146). The absolute max possible unit change and the absolute min possible unit change are then trimmed from the possible unit changes for the process parameter, so long as such changes are not equal to zero. For example, for the gas flow rate, an absolute max possible unit change is 6 and absolute min possible unit change is 0. Similarly, for the HFRF power, an absolute max possible unit change is 12 and an absolute min possible unit change is 0. The possible unit change of −6 is thus removed from the possible unit changes for the gas flow rate, and the possible unit change of 12 is thus removed from the possible unit changes for the HFRF power. By implementing the trimming process 440, the combination calculator module 144 generates about 196 possible process parameters tool set solutions based on the possible unit changes for the process parameters in table 340 (generated after the trimming process 440). The combination calculator module 144 thus reduces the number of possible tool tuning process parameter combinations from 256 to 196. The combination calculator module 144 then returns to block 442, where it is determined that the possible process parameter tool set solutions are now not over the specified limit.

The possible process parameter tool set solutions generated by the combination calculator module 144 in table 340 may be too aggressive, in other words, suggest too much change to one or more of the process parameters. At block 448, the combination calculator module 144 collaborates with the robust buffering module 148 to desensitize the possible process parameter tool set solutions via robust buffering. The robust buffering module 148 defines sensitivity adjustment criteria at block 240 that compensates for overly sensitive correlations between the various process monitor items to changes in the process parameters (here, the correlations defined in the sensitivity table 310). In the present example, the sensitivity adjustment criteria discounts the number of process parameter unit changes for each process parameter, thereby further reducing the number of possible unit changes for each process parameter as provided in table 350. For example, the sensitivity adjustment criteria define a discount of 0.6, meaning that the number of process parameter unit changes for each process parameter is reduced by 40%. In the present example, since the gas flow rate has seven possible process parameter unit changes, the discount dictates that each of these possible changes is estimated as 60% of its original value by rounding off with its unit. That is, the original set, (1, 0, −1, −2, −3, −4, −5) becomes discounted as (0.6, 0, −0.6, −1.2, −1.8, −2.4, −3), rounded off as (1, 0, −1, −1, −2, −2, −3), and then summarized as (1, 0, −1, −2, −3). Similarly, for the possible parameter unit changes in HFRF power (−2, 0, 2, 4, 6, 8, 10), are discounted to be (−1.2, 0, 1.2, 2.4, 3.6, 4.8, 6), rounded off and summarized as (−1, 0, 1, 2, 4, 5, 6). Alternatively, the sensitivity adjustment criteria defines a weighted minimization function, for example, $$\text{Min}(\Sigma \omega_i | \Delta Y_i^{offline} | + \Sigma \theta_j | \Delta X_j^{tool} |) \text{ Where}$$
$$Y_i^{offline} = Y_i^{offline} - Y_i^{target} \Delta X_j^{tool} = X_j^{tuned} - X_j^{current}$$

where the changes in the process parameters (X) are weighted against changes in the process monitor items (Y). By performing the robust buffering at block 448, the combination calculator module 144 thus reduces the number of possible process parameter tool set solutions to about 75 based on the possible unit changes for the process parameters in table 350.

The combination calculator module 144 also applies the behavior constraint criteria (defined by the engineering based knowledge module 142) to generate the set of possible tool tuning process parameter solutions. For example, as noted above, an exemplary behavior constraint for the gas flow rate ($SiH_4$) specifies that $-5 \leq \Delta SiH_4$ (side)$+\Delta SiH_4$ (top) $\leq 5$. Accordingly, any possible unit change in gas flow rate that is ±5 is removed from consideration when generating the possible tool tuning process parameter solutions. Such constraint may be applied to the possible unit changes provided in table 350. Further, as noted above, exemplary behavior constraint criteria specifies that (1) if $-0.001 < \Delta RI < 0.01$, then $SiH_4$ is disabled for tuning and (2) if $-0.2 < \Delta S < 0.2$, then $SiH_4$ is disabled for tuning. In the present example, the change in stress is zero (as indicated in table 300), and accordingly, the gas flow rate ($SiH_4$) should be disabled for tuning. This constraint can be applied at various times during the process flow for generating the set of possible tool tuning process parameter solutions. For example, the possible unit change for the gas flow rate is initially set to zero, so that possible unit changes for the gas flow rate are generated by the combination calculator module 144 as depicted in table 320, table 330, table 340, and table 350. In another example, once the combination calculator module 144 generates the table 350, the set of possible tool tuning process parameter solutions include only combinations of the process parameters where the gas flow rate is set to zero unit change. The present disclosure contemplates alternative application of the behavior constraints in generating the set of possible tool tuning process parameter solutions.

The combination calculator module 144 then determines all possible combinations of the process parameters from the table 350 to generate the set of possible process parameter tool tuning solutions. At block 450, the combination calculator module 144 sorts the possible process parameter tool sets according to an intelligent sorting algorithm. In an example, the intelligent sorting algorithm is defined by the engineering based knowledge module 142. In the present example, the combination calculator module 144 sorts and orders the possible parameter tool sets from minimum overall process parameter changes to maximum overall process parameter changes. As in table 350, (SiF4, HFRF, DepTime, Spacing) may have 105 combinations, including C1=(0, 0, 0, 1) and (1, 6, 0, 1), C1 will be prioritized due to its minor changes in all tuning parameters.

Returning to FIG. 3 and FIG. 4, the tool tuning optimization process flow 200 then continues to block 250 where the statistical optimizer module 146 evaluates and narrows the set of possible process parameter tool tuning solutions (in the present example, the sorted set of possible process parameter tool sets from table 350) to a set of best, optimal process parameter tool tuning solutions. The statistical optimizer module 146 applies behavior constraints (block 220) defined by the engineering based knowledge module 142 when narrowing the set of possible parameter tool tuning solutions. For example, the statistical optimizer module 146 evaluates the set of possible process parameter tool tuning solutions to find process parameter tool tuning solutions that minimize the optimization objection function defined by the engineering based knowledge module 142, specifically $$OOF=Min|6*\Delta S+1*\Delta RI+6*\Delta T|.$$

The statistical optimizer module 146 uses any suitable statistical optimizer. For example, the statistical optimizer module 146 implements the MIMO (multiple input/multiple output) optimizer described in U.S. Patent Application Publication No. 2012/0130525, entitled Adaptive and Automatic Determination of System Parameters, herein incorporated by reference in its entirety. Because the combination calculator module 144 provides a narrowly tailored, sorted set of possible process parameter tool tuning solutions, the statistical optimizer module 146 can generate the optimal set of possible process parameter tool tuning solutions much quicker than conventional tool tuning methods.

At block 260, the optimal process parameter tool tuning solutions are ranked according to the final results of optimized OOF values. some criteria. For example, the optimal process parameter tool tuning solutions are ranked according to a ranking criteria defined by the engineering based knowledge module 142 and/or the robust buffer module 148. Then, at block 270, some of the optimal process parameter tool tuning solutions are suggested for tuning the process tool, similarly based on some criteria, ex: the best one is selected or the average of the top 3 is suggested. Returning to FIG. 3, at block 150, the process tool 30 is tuned according to one of the suggested optimal process parameter tool tuning solutions. The tool tuning process flow 100 then returns to block 110, where another process tool performance check is performed to determine whether wafers processed by the process tool 30 exhibit desired process monitor items when the process tool 30 is configured according to the optimal process parameter tool tuning solution. If the process monitor items are within specification, at block 120, the process tool is released for production, where the process tool 30 processes wafers. If the process monitor items are not within specification, the tool tuning optimization process at block 130 is repeated until the process tool 30 is released for production.

Figure 7:
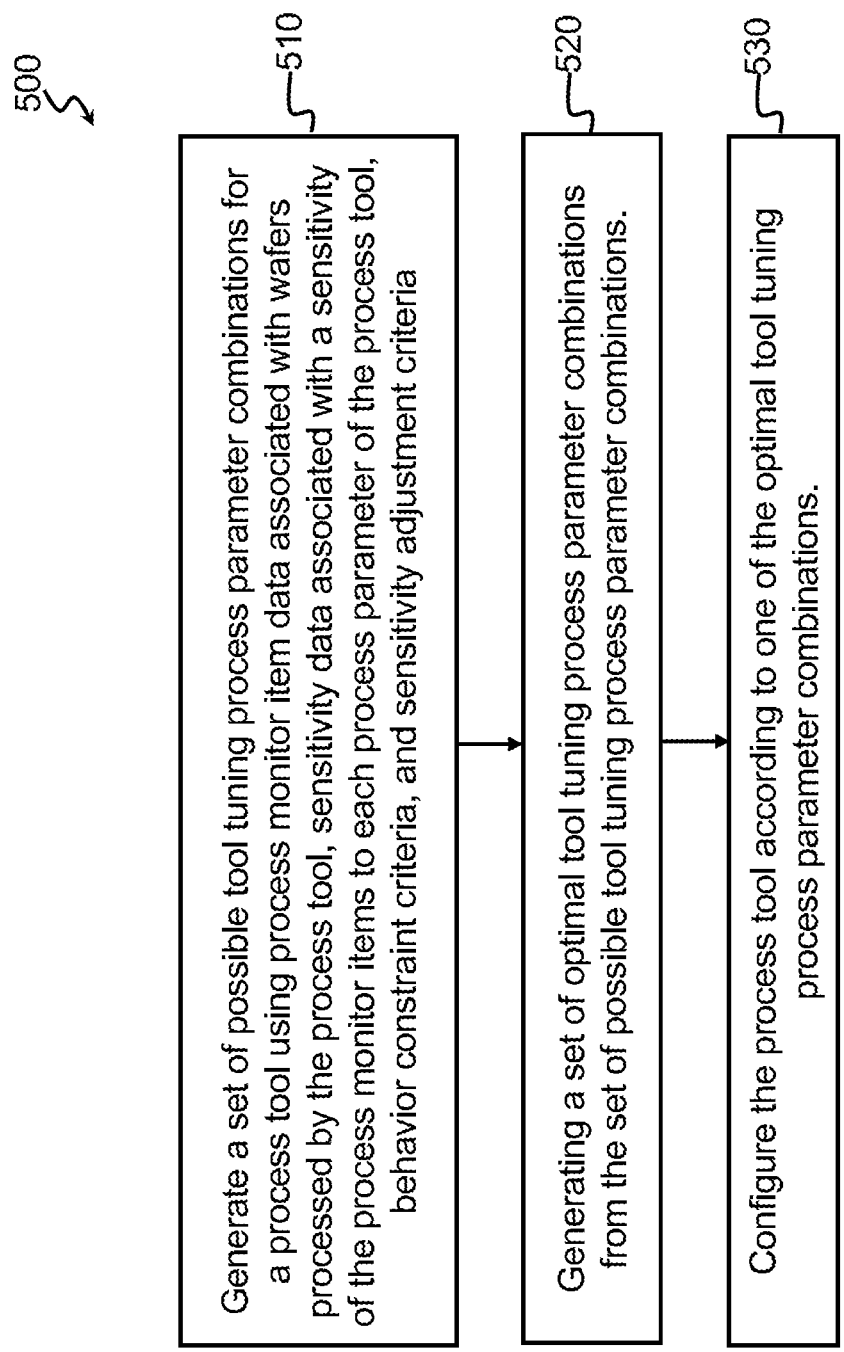
FIG. 7 is a flow chart of a method for tuning a process tool according to various aspects of the present disclosure.

FIG. 7 is a flow chart of a method 500 for tuning process parameters of a process tool such that the wafers processed by the process tool exhibit desired process monitor items according to various aspects of the present disclosure. In an example, the method 500 is used to tune the process tool 30 in integrated circuit device fabrication system 10 of FIG. 1. At block 510, a set of possible tool tuning process parameter combinations is generated as described above with reference to FIGS. 1-6. The set of possible tool tuning process parameter combinations are generated using process monitor item data associated with wafers processed by the process tool, sensitivity data associated with a sensitivity of the process monitor items to each process parameter, behavior constraint criteria, and sensitivity adjustment criteria. At block 520, a set of optimal tool tuning process parameter combinations is generated from the set of possible tool tuning process parameter combinations as described above with reference to FIGS. 1-6. At block 530, the process tool is configured according to one of the optimal tool tuning process parameter combinations as described above with reference to FIGS. 1-6. The method 500 can further include processing wafers with the process tool configured according to the one of the optimal tool tuning process parameter combinations. Additional steps can be provided before, during, and after the method 500, and some of the steps described can be replaced, eliminated, or moved around for other embodiments of the method 500.

Figure 8:
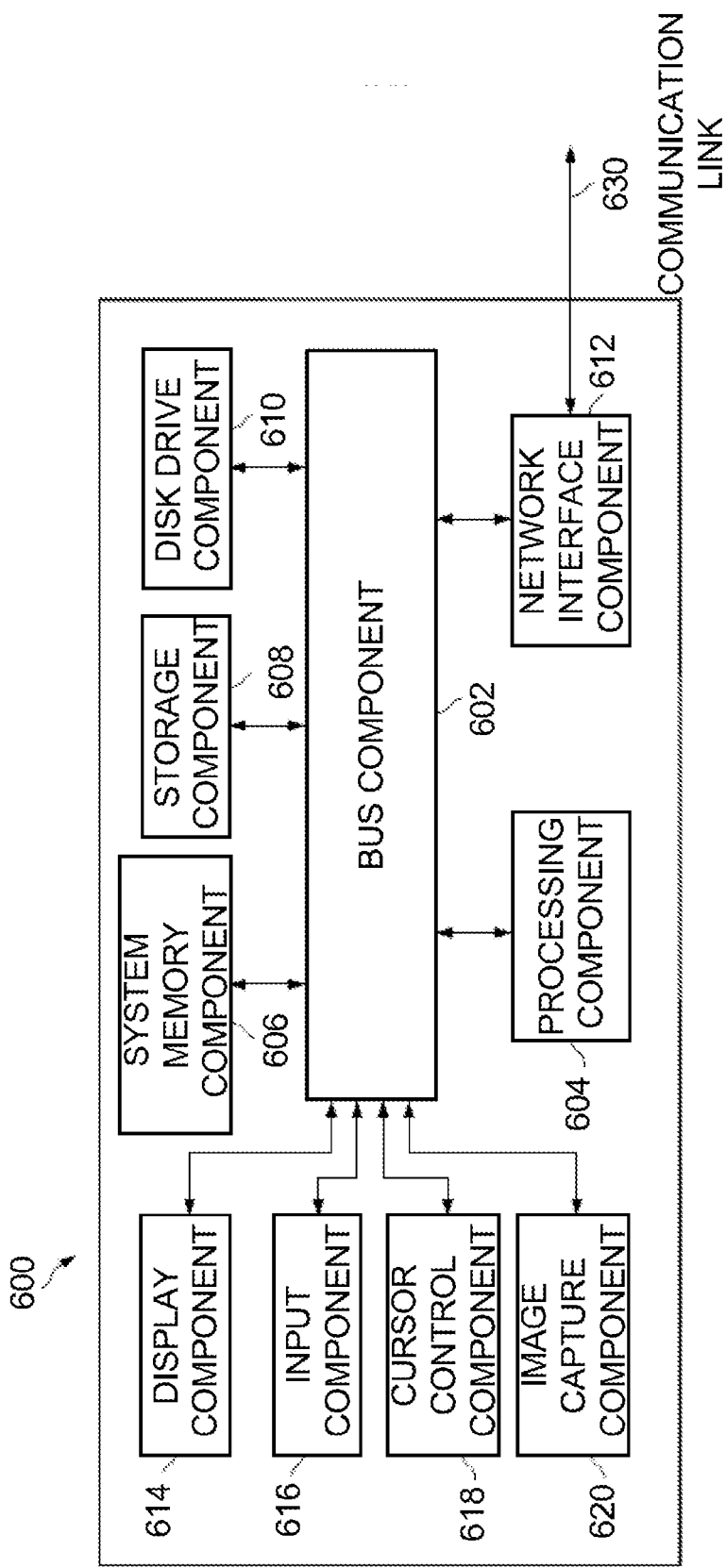
FIG. 8 is a block diagram of a computer system for implementing a method for tuning a process tool, such as the methods described with reference to FIGS. 2-7 according to various aspects of the present disclosure.

FIG. 8 is a block diagram of a computer system 600 for implementing the various methods and systems described herein, for example, the various method blocks of the methods 100, 200, 400, and 500 discussed above. For example, the computer system 600 is operable to determine an optimal tool tuning process parameter set for tuning a process tool, such as the process tool 30. In the present example, the tool tuning system 80 includes the computer system 600 for tuning the process tool 30. In various implementations, devices of the computer system 600 include a network communications device or a network computing device (for example, mobile cellular phone, laptop, personal computer, network server, etc.) capable of communicating with a network (for example, an intranet or the Internet). It should be appreciated that each of the devices may be implemented as the computer system 600 for communication with the network in a manner as follows.

In accordance with various embodiments of the present disclosure, the computer system 600, such as a local computer or a networked computer system, includes a bus component 602 or other communication mechanism for communicating information, which interconnects subsystems and components, such as a processing component 604 (for example, a processor, a micro-controller, a digital signal processor (DSP), other processing component, or combinations thereof), a system memory component 606 (such as a RAM), a static storage component 608 (such as a ROM), a disk drive component 610 (such as a magnetic component, an optical component, other component, or combination thereof), network interface component 612 (for example, a modem, Ethernet card, other network interface component, or combination thereof), a display component 614 (for example, a cathode ray tube (CRT), liquid crystal display (LCD), other display component, or combination thereof), an input component 616 (such as a keyboard), a cursor control component 618 (such as a mouse or a trackball), and an image capture component 620 (such as an analog or digital camera). In one implementation, the disk drive component 610 includes a database having one or more disk drive components.

In accordance with embodiments of the present disclosure, the computer system 600 performs specific operations by processor 604 executing one or more sequences of one or more instructions contained in system memory component 606. In an example, such instructions are read into system memory component 606 from another computer readable medium, such as static storage component 608 or disk drive component 610. In another example, hard-wired circuitry is used in place of (or in combination with) software instructions to implement the present disclosure. In further accordance with embodiments of the present disclosure, logic is encoded in a computer readable medium, which refers to any medium that participates in providing instructions to the processor component 604 for execution. Such a medium takes many forms, including but not limited to, non-volatile media and volatile media. In an example, the computer readable medium is non-transitory. In various implementations, non-volatile media includes optical or magnetic disks, such as the disk drive component 610, and volatile media includes dynamic memory, such as system memory component 606. In one aspect, data and information related to execution instructions is transmitted to computer system 600 via a transmission media, such as in the form of acoustic or light waves, including those generated during radio wave and infrared data communications. In various implementations, transmission media includes coaxial cables, copper wire, and fiber optics, including wires that comprise bus 602.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In various embodiments of the present disclosure, the computer system 600 performs execution of instruction sequences to practice the present disclosure. In various other embodiments of the present disclosure, various computer systems, such as computer system 600, are coupled by communication link 630 (for example, a communications network, such as a LAN, WLAN, PTSN, and/or various other wired or wireless networks, including telecommunications, mobile, and cellular phone networks) and perform instruction sequences to practice the present disclosure in coordination with one another. In various examples, the computer system 600 transmits and receives messages, data, information and instructions, including one or more programs (in other words, application code) through communication link 630 and communication interface 612. The processor component 804 can execute the programs code as received and/or stored in the disk drive component 610 or some other non-volatile storage component for execution.

Where applicable, various embodiments provided by the present disclosure are implemented using hardware, software, or combinations of hardware and software. Also, where applicable, the various hardware components and/or software components set forth herein are combined into composite components comprising software, hardware, and/or both without departing from the spirit of the present disclosure. Where applicable, the various hardware components and/or software components set forth herein are separated into sub-components comprising software, hardware, or both without departing from the scope of the present disclosure. In addition, where applicable, it is contemplated that software components are implemented as hardware components and vice-versa. Software, in accordance with the present disclosure, such as computer program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein are changed, combined into composite steps, and/or separated into sub-steps to provide features described herein.

The present disclosure provides for many different embodiments. An exemplary method for tuning process parameters of a process tool such that the wafers processed by the process tool exhibit desired process monitor items includes defining behavior constraint criteria and sensitivity adjustment criteria; generating a set of possible tool tuning process parameter combinations using process monitor item data associated with wafers processed by the process tool, sensitivity data associated with a sensitivity of the process monitor items to each process parameter, the behavior constraint criteria, and the sensitivity adjustment criteria; generating a set of optimal tool tuning process parameter combinations from the set of possible tool tuning process parameter combinations; and configuring the process tool according to one of the optimal tool tuning process parameter combinations. The method further includes processing wafers with the process tool configured according to the one of the optimal tool tuning process parameter combinations.

In an example, N process parameters are associated with the process tool, and the method further includes selecting a number (n) of the N process parameters for tuning such that the set of possible tool tuning process parameter combinations includes various tool tuning combinations for the n process parameters. In an example, generating the set of possible tool tuning process parameter combinations includes generating a first number of possible tool tuning process parameter combinations; generating a second number of possible tool tuning process parameter combinations from the first number of possible tool tuning process parameter combinations, wherein the second number is larger than the first number; generating a third number of possible tool tuning process parameter combinations from the second number of possible tool tuning process parameter combinations, wherein the third number is smaller than the second number; and generating a fourth number of possible tool tuning process parameter combinations from the third number of possible tool tuning process parameter combinations, wherein the fourth number is smaller than the third number.

In an example, the first number of possible tool tuning process parameter combinations is generated using the process monitor item data and the sensitivity data to generate a set of process parameter values for each process parameter. Then, in an example, the second number of possible tool tuning process parameter combinations is generated by performing, for each process parameter, a growing process to expand each set of process parameter values. In furtherance of the example, the third number of possible tool tuning process parameter combinations is generated by determining whether the second number is larger than a predefined number of possible tool tuning process parameter combinations; and performing a trimming process to at least one set of the process parameter values until a number of possible tool tuning process parameter combinations is less than or equal to the predefined number. In even furtherance of the example, the fourth number of possible tool tuning process parameter combinations is generated by applying the sensitivity adjustment criteria to the third number of possible tool tuning process parameter combinations. In an example, the behavior constraint criteria defines an optimization object function; and the generating the set of optimal tool tuning process parameter combinations from the set of possible tool tuning process parameter combinations includes determining the tool tuning process parameter combinations that minimize a value of the optimization object function. The behavior constraint criteria can further define correlations between the process parameters that constrain tuning of the process parameters, correlations between the process monitor items that constrain tuning of the process parameters, and correlations between the process parameters and the process monitor items that constrain tuning of the process parameters.

An exemplary method for qualifying a process tool for production includes processing wafers with a process tool; and determining whether process monitor item data associated with the wafers processed by the process tool are within specification, such that if the process monitor item data is within specification, releasing the process tool for production, and if the process monitor item data is not within specification, tuning the process parameter tool set of the process tool. The tuning includes defining behavior constraint criteria and sensitivity adjustment criteria; generating a set of possible tool tuning process parameter combinations using the process monitor item data associated with the wafers processed by the process tool, sensitivity data associated with a sensitivity of the process monitor items to each process parameter, the behavior constraint criteria, and the sensitivity adjustment criteria; generating a set of optimal tool tuning process parameter combinations from the set of possible tool tuning process parameter combinations; and configuring the process tool according to one of the optimal tool tuning process parameter combinations. The method further includes repeating the processing wafers and the determining whether the process monitor item data associated with the wafers processed by the process tool are within specification until the process tool is released for production. In an example, the method further includes performing maintenance on the process tool before the processing and determining whether the process monitor item data associated with the wafers processed by the process tool are within specification. In an example, the method further includes, after releasing the process tool for production, processing wafers with the process tool.

In an example, generating the set of possible tool tuning process parameter combinations includes generating a first number of possible tool tuning process parameter combinations; generating a second number of possible tool tuning process parameter combinations from the first number of possible tool tuning process parameter combinations, wherein the second number is larger than the first number; generating a third number of possible tool tuning process parameter combinations from the second number of possible tool tuning process parameter combinations, wherein the third number is smaller than the second number; and generating a fourth number of possible tool tuning process parameter combinations from the third number of possible tool tuning process parameter combinations, wherein the fourth number is smaller than the third number. In an example, the first number of possible tool tuning process parameter combinations is generated using the process monitor item data and the sensitivity data to generate a set of process parameter values for each process parameter; the second number of possible tool tuning process parameter combinations is generated by performing a growing process to expand each set of process parameter values; the third number of possible tool tuning process parameter combinations is generated by performing a trimming process to at least one set of the process parameter values; and the fourth number of possible tool tuning process parameter combinations is generated by applying the sensitivity adjustment criteria to the third number of possible tool tuning process parameter combinations. In an example, the behavior constraint criteria defines an optimization object function; and the generating the set of optimal tool tuning process parameter combinations from the set of possible tool tuning process parameter combinations includes evaluating the fourth number of possible tool tuning process parameter combinations to determine the tool tuning process parameter combinations that minimize a value of the optimization object function. In an example, the fourth number of possible tool tuning process combinations is sorted such that combinations that minimize changes to the process parameters are listed first.

An exemplary integrated circuit manufacturing system for implementing the methods described herein includes a process tool configured to perform a process on wafers and a process tool tuning system configured to determine a process parameter tool set for the process tool. The process tool tuning system includes a tool tuning solution module configured to generate a set of possible tool tuning process parameter combinations using process monitor item data associated with wafers processed by the process tool, sensitivity data associated with a sensitivity of the process monitor items to each process parameter, predefined behavior constraint criteria, and predefined sensitivity adjustment criteria; and generating a set of optimal tool tuning process parameter combinations from the set of possible tool tuning process parameter combinations. In an example, the tool tuning solution module includes various modules for determining the process parameter tool set. For example, the tool tuning solution module can include an engineering based knowledge module that defines the behavior constraint criteria; a combination calculator module configured to generate the set of possible tool tuning process parameter combinations; a statistical optimizer module configured to generate the set of optimal tool tuning process parameter combinations; and a robust buffer module configured to define the sensitivity adjustment criteria.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for tuning process parameters of a process tool such that the wafers processed by the process tool exhibit desired process monitor items, the method comprising:
    defining behavior constraint criteria and sensitivity adjustment criteria;
    generating a set of possible tool tuning process parameter combinations using process monitor item data associated with wafers processed by the process tool, sensitivity data associated with a sensitivity of the process monitor items to each process parameter, the behavior constraint criteria, and the sensitivity adjustment criteria, wherein the generating the set of possible tool tuning process parameter combinations includes:
applying a discount of the sensitivity adjustment criteria to a set of process parameter values for each process parameter to generate a discounted set of process parameter values for each process parameter, wherein the discounted set of process parameter values has a reduced number of process parameter values; and
generating the set of possible tool tuning process parameter combinations using the discounted set of process parameter values;
generating a set of optimal tool tuning process parameter combinations from the set of possible tool tuning process parameter combinations; and
configuring the process tool according to one of the optimal tool tuning process parameter combinations.

2. The method of claim 1 wherein N process parameters are associated with the process tool, the method further including selecting a number (n) of the N process parameters for tuning such that the set of possible tool tuning process parameter combinations includes various tool tuning combinations for the n process parameters.

3. The method of claim 1 wherein the generating the set of possible tool tuning process parameter combinations includes:
generating a first number of possible tool tuning process parameter combinations;
generating a second number of possible tool tuning process parameter combinations from the first number of possible tool tuning process parameter combinations, wherein the second number is larger than the first number; and
generating a third number of possible tool tuning process parameter combinations from the second number of possible tool tuning process parameter combinations, wherein the third number is smaller than the second number.

4. The method of claim 3 wherein the generating the set of possible tool tuning process parameter combinations further includes generating a fourth number of possible tool tuning process parameter combinations from the third number of possible tool tuning process parameter combinations, wherein the fourth number is smaller than the third number.

5. The method of claim 4 wherein the generating the fourth number of possible tool tuning process parameter combinations includes:
applying the sensitivity adjustment criteria to the third number of possible tool tuning process parameter combinations to determine the possible tool tuning process parameter combinations that minimize a value of a weighted minimization function of the sensitivity adjustment criteria,
wherein the weighted minimization function defines weights of changes in the process parameter values for the process parameters against changes in the process monitor item data for the process monitor items.

6. The method of claim 3 wherein the generating the first number of possible tool tuning process parameter combinations includes using the process monitor item data and the sensitivity data to generate the set of process parameter values for each process parameter.

7. The method of claim 6 wherein the generating the second number of possible tool tuning process parameter combinations includes, for each process parameter, performing a growing process to expand each set of process parameter values.

8. The method of claim 7, wherein the generating the third number of possible tool tuning process parameter combinations includes:
determining that the second number is larger than a predefined number of possible tool tuning process parameter combinations; and
performing a trimming process to at least one set of the process parameter values until a number of possible tool tuning process parameter combinations is less than or equal to the predefined number.

9. The method of claim 1 wherein:
the behavior constraint criteria defines an optimization object function; and
the generating the set of optimal tool tuning process parameter combinations from the set of possible tool tuning process parameter combinations includes determining the tool tuning process parameter combinations that minimize a value of the optimization object function.

10. The method of claim 1 wherein the defining the behavior constraint criteria includes:
defining correlations between the process parameters that constrain tuning of the process parameters;
defining correlations between the process monitor items that constrain tuning of the process parameters; and
defining correlations between the process parameters and the process monitor items that constrain tuning of the process parameters.

11. The method of claim 1 further including processing wafers with the process tool configured according to the one of the optimal tool tuning process parameter combinations.

12. A method comprising:
processing wafers with a process tool; and
determining that process monitor item data associated with the wafers processed by the process tool are not within specification;
tuning a process parameter tool set of the process tool, wherein the tuning includes:
defining behavior constraint criteria and sensitivity adjustment criteria;
generating a set of possible tool tuning process parameter combinations using the process monitor item data associated with the wafers processed by the process tool, sensitivity data associated with a sensitivity of the process monitor items to each process parameter, the behavior constraint criteria, and the sensitivity adjustment criteria, wherein the generating the set of possible tool tuning process parameter combinations includes:
generating a first number of possible tool tuning process parameter combinations by minimizing a value of a weighted minimization function of the sensitivity adjustment criteria, wherein the weighted minimization function defines weights of changes in process parameter values for the process parameters against changes in the process monitor item data for the process monitor items;
generating a second number of possible tool tuning process parameter combinations from the first number of possible tool tuning process parameter combinations, wherein the second number is larger than the first number, wherein the generating the second number of possible tool tuning process parameter combinations includes:

for each process parameter, performing a growing process to expand each set of process parameter values by including quartiles of the set of process parameter values;

generating a set of optimal tool tuning process parameter combinations from the set of possible tool tuning process parameter combinations;

configuring the process tool according to one of the optimal tool tuning process parameter combinations; and repeating the processing wafers and the determining that the process monitor item data associated with the wafers processed by the process tool are not within specification until the process monitor item data associated with the wafers processed by the process tool are within specification.

13. The method of claim 12 further including performing maintenance on the process tool before the processing and determining whether the process monitor item data associated with the wafers processed by the process tool are within specification.

14. The method of claim 12 wherein the generating the set of possible tool tuning process parameter combinations includes:

generating a third number of possible tool tuning process parameter combinations from the second number of possible tool tuning process parameter combinations, wherein the third number is smaller than the second number; and generating a fourth number of possible tool tuning process parameter combinations from the third number of possible tool tuning process parameter combinations, wherein the fourth number is smaller than the third number.

15. The method of claim 14 wherein the generating the set of possible tool tuning process parameter combinations includes sorting the fourth number of possible tool tuning process combinations.

16. The method of claim 14 wherein:

the generating the third number of possible tool tuning process parameter combinations includes performing a trimming process to at least one set of the process parameter values; and the generating the fourth number of possible tool tuning process parameter combinations includes applying the sensitivity adjustment criteria to the third number of possible tool tuning process parameter combinations.

17. The method of claim 14 wherein:

the behavior constraint criteria defines an optimization object function; and the generating the set of optimal tool tuning process parameter combinations from the set of possible tool tuning process parameter combinations includes evaluating the fourth number of possible tool tuning process parameter combinations to determine the tool tuning process parameter combinations that minimize a value of the optimization object function.

18. The method of claim 12 further including, after releasing the process tool for production, processing wafers with the process tool.

19. An integrated circuit manufacturing system comprising:

a process tool configured to perform a process on wafers; and a process tool tuning system configured to determine a process parameter tool set for the process tool, wherein the process tool tuning system includes a tool tuning solution module configured to:

generate a set of possible tool tuning process parameter combinations using process monitor item data associated with wafers processed by the process tool, sensitivity data associated with a sensitivity of the process monitor items to each process parameter, predefined behavior constraint criteria, and predefined sensitivity adjustment criteria, wherein the generating the set of possible tool tuning process parameter combinations includes:

performing a trimming process to the set of possible tool tuning process parameter combinations values until a size of the set of possible tool tuning process parameter combinations is less than or equal to a predefined number, wherein the performing the trimming process includes:

determining a process parameter having the most process parameter values; and removing a process parameter value for the process parameter; and generate a set of optimal tool tuning process parameter combinations from the set of possible tool tuning process parameter combinations.

20. The integrated circuit manufacturing system of claim 19, wherein the tool tuning solution module includes:

an engineering based knowledge module that defines the behavior constraint criteria;

a combination calculator module configured to generate the set of possible tool tuning process parameter combinations;

a statistical optimizer module configured to generate the set of optimal tool tuning process parameter combinations; and a robust buffer module configured to define the sensitivity adjustment criteria.

\* \* \* \* \*